United States Patent
Saville et al.

(10) Patent No.: US 10,397,226 B2
(45) Date of Patent: Aug. 27, 2019

(54) METHODS AND SYSTEMS USING TRUST-BUT-VERIFY DYNAMIC QUALITY-OF-SERVICE (QOS)

(71) Applicant: Cisco Technology, Inc., San Jose, CA (US)

(72) Inventors: Roland Arthur Saville, Boca Raton, FL (US); Thomas Paul Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 15/376,116

(22) Filed: Dec. 12, 2016

(65) Prior Publication Data
US 2018/0131695 A1 May 10, 2018

Related U.S. Application Data

(60) Provisional application No. 62/419,415, filed on Nov. 8, 2016.

(51) Int. Cl.
*H04L 29/06* (2006.01)
*H04L 12/851* (2013.01)
(Continued)

(52) U.S. Cl.
CPC .............. *H04L 63/10* (2013.01); *H04L 47/10* (2013.01); *H04L 47/2408* (2013.01);
(Continued)

(58) Field of Classification Search
CPC combination set(s) only.
See application file for complete search history.

(56) References Cited

U.S. PATENT DOCUMENTS

7,096,260 B1  8/2006 Zavalkovsky et al.
8,873,395 B1 * 10/2014 Prock ................... H04W 76/18
                                                   370/235
(Continued)

FOREIGN PATENT DOCUMENTS

WO    2015/038911    3/2015

OTHER PUBLICATIONS

European Search Report, dated Jan. 11, 2018, received in connection with EP Patent Application No. 17183157.1.

*Primary Examiner* — Minh Dinh
(74) *Attorney, Agent, or Firm* — Meunier Carlin & Curfman LLC

(57) ABSTRACT

Exemplified system and method optimizes dynamic Quality of Service (QoS) operation across a network infrastructure to alleviate time constraints when applying dynamic QoS policy on newly initiated traffic flow, particularly for various data streams. Initially, and by default, the exemplified system and method temporarily applies a high QoS policy to a newly initiated traffic flow and then verifies the QoS legitimacy of the flow to which the high QoS policy for the newly initiated traffic flow is maintained or is reduced to a lower-priority QoS policy. This trust-but-verify QoS operation allows new traffic, e.g., with voice and video components, to receive a high QoS PHB treatment as transmission of the traffic is initiated without having a nominal delay at the beginning of the call before QoS is applied while allowing the QoS legitimacy to be validated and maintained.

13 Claims, 7 Drawing Sheets

(51) Int. Cl.
*H04L 12/801* (2013.01)
*H04L 12/833* (2013.01)
*H04L 12/891* (2013.01)

(52) U.S. Cl.
CPC ...... *H04L 47/2441* (2013.01); *H04L 47/2458* (2013.01); *H04L 47/2483* (2013.01); *H04L 47/31* (2013.01); *H04L 47/41* (2013.01); *H04L 63/08* (2013.01)

(56) References Cited

U.S. PATENT DOCUMENTS

| | | | |
|---|---|---|---|
| 8,976,813 B2 * | 3/2015 | Bekiares | H04L 47/24 370/474 |
| 2004/0125797 A1 | 7/2004 | Raisanen et al. | |
| 2007/0206545 A1 * | 9/2007 | Lee | H04W 72/10 370/338 |
| 2009/0067328 A1 * | 3/2009 | Morris | H04W 72/1242 370/230.1 |
| 2013/0114456 A1 * | 5/2013 | Dahod | H04L 47/10 370/252 |

* cited by examiner

METHODS AND SYSTEMS USING TRUST-BUT-VERIFY DYNAMIC QUALITY-OF-SERVICE (QOS)

RELATED APPLICATION

This application claims priority to, and the benefit of, U.S. Provisional Application No. 62/419,415, filed Nov. 8, 2016, titled "METHODS AND SYSTEMS USING TRUST-BUT-VERIFY DYNAMIC QUALITY-OF-SERVICE (QOS)," which is incorporated by reference herein in its entirety.

TECHNICAL FIELD

The disclosure relates to a method and system of controlling a quality of a service on a data network.

BACKGROUND

Quality of Service (QoS) generally relates to the operation of determining transmission rates, error rates, and other characteristics associated with a network service, to the extent they can be measured, and to guarantee such characteristics in advance. In some embodiments, QoS policies allow packets to be prioritized at specific network nodes. For example, when a high-priority is being passed through a network node, the network node may forward these higher priority packets prior to forwarding other lower priority packets by withholding the lower priority packets or putting the high-priority packets in certain high-priority queues.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
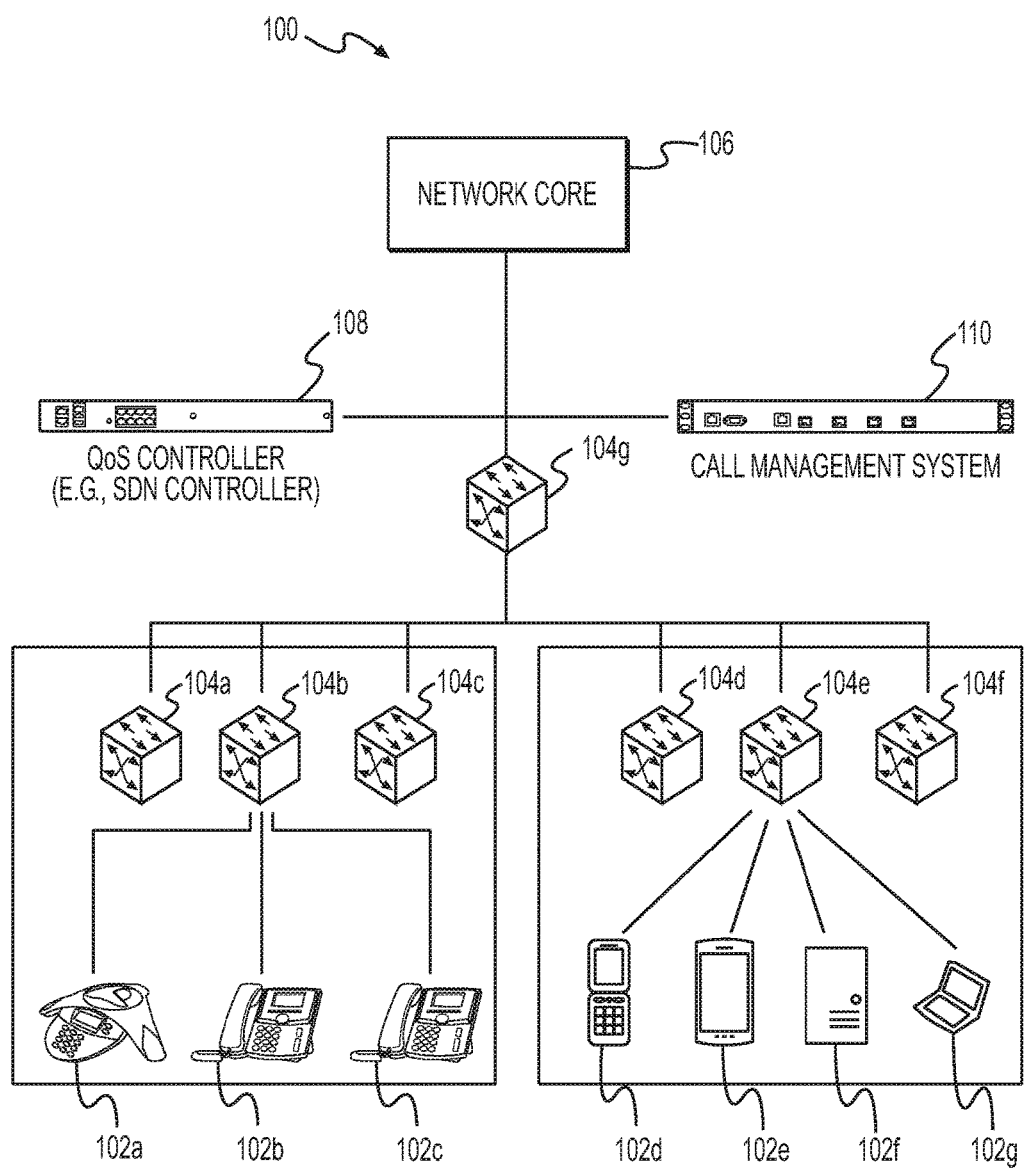
FIG. 1 is a diagram of an example network 100 that operates a trust-but-verify dynamic QoS operation, in accordance with an illustrative embodiment.

The exemplified system and method optimizes dynamic Quality of Service (QoS) operation across a network infrastructure to alleviate time constraints when applying dynamic QoS policy on newly initiated traffic flow, particularly for voice, video, or media data streams. Initially, and by default, the exemplified system and method temporarily applies a high QoS policy (e.g., a preferential or highest priority designation) to a newly initiated traffic flow and then verifies the QoS legitimacy of the flow to which the high QoS policy for the newly initiated traffic flow is maintained or is reduced to a lower-priority QoS policy. To this end, the newly initiated traffic flow is first associated with a high QoS marking, e.g., at an access-layer switch, prior to the traffic flow being authenticated for such designation and, in some instances, prior to the authentication process being initiated. This trust-but-verify QoS operation allows applications, running on a given computing device, with voice and video components, to receive a high QoS PHB treatment as the voice or video call is initiated without having a nominal delay at the beginning of the call before QoS is applied while allowing the QoS legitimacy of the flow to be validated, e.g., through notifications from a QoS controller (e.g., a software-defined networking controller designated as an authoritative source of legitimacy information).

Among other things, the exemplified system and method facilitate improved operation of codecs, (i.e., coder-decoder) used to decode an encoded, or encrypted, data stream from a given transmission. Many codecs (e.g., those associated with voice, video, and media encoding/decoding and/or encryption) often adjust decoding operations based on detected characteristics of a network and/or data stream often within a first few hundred milliseconds after the data stream (e.g., for voice and media) has begun to flow across the network. The exemplified system and method, thus, applies application of dynamic QoS policies, at the first few hundred milliseconds of flow, critical in setting up the initial quality settings for a given voice, video, or media data stream.

In some embodiments, the exemplified system and method temporarily applies, initially, and by default, a high (i.e., preferential) QoS policy to a new device (e.g., a telephone or videoconference device) upon its discovery or initiation into a given traffic and then verifies the QoS legitimacy of the device either to maintain the device at that high QoS policy or to reduce the device to a reduced QoS policy.

In some embodiments, the exemplified system and method uses application inspection operations, such as IP ACLs (Access Control Lists) operations, Network Based Application Recognition (NBAR) operations, and/or Application Visibility and Control (AVC) operations, e.g., to identify application flows having voice or video components (e.g., at a given access point) and that are associated with call management systems. The call management systems communicate application flows to a QoS controller (e.g., a SDN controller), which authenticates the application flows for a given QoS policy, and cause the policy to be installed at the given access point.

In an aspect, an apparatus (e.g., a wireless access switch) is disclosed. The apparatus includes network ports; a processor coupled to the network ports and a memory; and the memory having instructions stored thereon, wherein execution of the instructions, cause the processor to: in response to receiving, at one of the network ports, one or more first inbound traffic associated with a first flow from a computing device (e.g., prior to the first inbound traffic being authenticated as a preferential flow), the one or more first inbound traffic being determined to have a voice or a video component, i) classify (e.g., immediately classify) each of the one or more first inbound traffic with an initial high QoS (Quality of Service) PHB (Per-Hop Behavior) marking and ii) transmit to a network device in the network the one or more first inbound traffic with the initial high QoS PHB markings; and initiate authentication of the first flow as being a preferential flow (e.g., by sending an authentication request to a software-defined network controller in the network), wherein, in response to receiving, during the authentication process, one or more subsequent inbound traffic associated with the first flow from the computing device (e.g., prior to the one or more subsequent inbound traffic being determined to be associated with the preferential flow) (e.g., the one or more subsequent inbound traffic associated with the first flow being determined to have a voice or a video component), i) classify the one or more subsequent inbound traffic with the initial high QoS PHB markings and ii) transmit to the network device the one or more subsequent inbound traffic with the initial high QoS PHB markings.

In some embodiments, the instructions, when executed by the processor, cause the processor to: in response to determining the first inbound traffic associated with the first flow having a preferential flow designation, cause additional inbound traffic associated with the first flow received from the computing device after the authentication process to continue to be classified with the initial high QoS PHB markings; and in response to not determining the first inbound traffic having a preferential flow designation, cause each additional inbound traffic associated with the first flow received from the computing device after the authentication process to be classified with a second QoS PHB marking, wherein the second QoS PHB marking has a lower preferential value as compared to the initial high QoS PHB marking.

In some embodiments, the second QoS PHB markings is based on a determined authentication value determined for the first flow.

In some embodiments, the instructions, when executed by the processor, cause the processor to: in response to receiving one or more second inbound traffic associated with a second flow (e.g., the second flow being different from the first flow) from the computing device (e.g., prior to the second inbound traffic being authenticated as a preferential flow), the one or more second inbound traffic being determined to have a second voice or a second video component, i) classify (e.g., immediately classify) each of the one or more second inbound traffic with the initial high QoS PHB marking and ii) transmit to a given network device in the network the one or more second inbound traffic with the initial high QoS PHB markings; and initiate authentication of the one or more second inbound traffic as being a preferential flow (e.g., by sending a second authentication request to a software-defined network controller in the network), wherein, in response to receiving, during the authentication process, one or more second subsequent inbound traffic associated with the second flow from the computing device (e.g., prior to the one or more second subsequent inbound traffic being associated with a preferential flow), the one or more second subsequent inbound traffic associated with the second flow being determined to have a second voice or a second video component, i) classify the one or more second subsequent inbound traffic with the initial high QoS PHB markings and ii) transmit to the given network device the one or more second subsequent inbound traffic with the initial high QoS PHB markings.

In some embodiments, the instructions, when executed by the processor, cause the processor to: concurrent with the transmission of the one or more first inbound traffic with the initial high QoS PHB markings, initiate a timer associated with authentication of the first flow; and, in response to an expiration of the timer, cause each additional inbound traffic associated with the first flow received from the computing device to be classified with a second QoS PHB marking, wherein the second QoS PHB markings has a lower preferential value as compared to the initial high QoS PHB markings.

In some embodiments, the instructions, when executed by the processor, cause the processor to: in response to receipt of a notification (e.g., from a SDN controller) of a successful authentication of the first flow being associated with a preferential flow, cause the timer associated with the first flow to reset so as not to expire.

In some embodiments, the classification and transmission of each of the one or more subsequent inbound traffic with the initial high QoS PHB marking and the concurrent validation of the computing device or the one or more subsequent inbound traffic being associated with a trusted device, collectively, comprises a trust-but-verify dynamic QoS design approach.

In another aspect, an apparatus (e.g., an access switch, e.g., configured to perform "trust but verify" operation for a device) is disclosed. The apparatus includes network ports; a processor coupled to the network ports and a memory; and the memory having instructions stored thereon, wherein execution of the instructions, cause the processor to: in response to receiving, at one of the network ports, from a computing device (e.g., a telephone or videoconference device), a discovery protocol message for the computing device and one or more first inbound traffic associated with a first flow (e.g., prior to the computing device being authenticated as a trusted device), the one or more first inbound traffic being determined to have a voice or a video component, i) classify (e.g., immediately classify) each of the one or more first inbound traffic with an initial high QoS (Quality of Service) PHB (Per-Hop Behavior) marking and ii) transmit to a network device in the network the one or more first inbound traffic with the initial high QoS PHB markings; and initiate authentication of the computing device as a trusted device in the network (e.g., by sending an authentication request to a software-defined network controller in the network), wherein, in response to receiving, during the authentication process, one or more subsequent inbound traffic (e.g., associated with the first flow) from the computing device (e.g., prior to the computing device being determined to be a trusted device), i) classify the one or more subsequent inbound traffic with the initial high QoS PHB markings and ii) transmit to the network device the one or more subsequent inbound traffic with the initial high QoS PHB markings.

In some embodiments, the instructions, when executed by the processor, cause the processor to: in response to determining the computing device being an authenticated trusted device, cause additional inbound traffic received from the computing device after the authentication process to continue to be classified with the initial high QoS PHB markings; and, in response to not determining the computing device to be an authenticated trusted device, cause each additional inbound traffic received from the computing device after the authentication process to be classified with a second QoS PHB marking, wherein the second QoS PHB marking has a lower preferential value as compared to the initial high QoS PHB marking. In some embodiments, the second QoS PHB markings is based on a determined authentication level for the computing device.

In some embodiments, the instructions that initiate authentication of the computing device as a trusted device comprises instructions, which when executed by the processor, cause the processor to: register parameters associated with the computing device from the discovery protocol message with a communication manager; and initiate a timer associated with authentication of the second computing device as a trusted device, wherein, in response to an expiration of the timer, cause each inbound traffic received from the computing device to be classified with a second QoS PHB marking, wherein the second QoS PHB markings has a lower preferential value as compared to the initial high QoS PHB markings.

In some embodiments, the instructions that initiate authentication of the computing device as a trusted device comprises instructions, which when executed by the processor, cause the processor to: register parameters associated with the computing device from the discovery protocol message with a communication manager; and in response to a successful authentication of the computing device, add a static policy to trust voice/video flows from the computing device.

In some embodiments, receipt of the discovery protocol message from the computing device causes the apparatus to dynamically extend trust to the computing device prior to the computing device being authentication as a trusted device in the network.

In some embodiments, the dynamic extension of trust to the second computing device prior to the second computing device being authentication as a trusted device in the network comprises a trust-but-verify dynamic QoS design approach.

In another aspect, a method (e.g., to provide QoS operations) is disclosed. The method includes, in response to receipt, at a network port of a first computing device (e.g., an access switch), one or more first inbound traffic associated with a first flow from a second computing device (e.g., a telephone or videoconference device) (e.g., prior to the first inbound traffic being authenticated as a preferential flow), the one or more first inbound traffic being determined to have a voice or a video component, i) classifying (e.g., immediately classifying) each of the one or more first inbound traffic with an initial high QoS (Quality of Service) PHB (Per-Hop Behavior) marking and ii) transmitting to a third computing device (e.g., a switch) in the network the one or more first inbound traffic with the initial high QoS PHB markings; and initiating authentication of the first flow as being a preferential flow (e.g., by sending an authentication request to a software-defined network controller in the network), wherein, in response to receiving, during the authentication process, one or more subsequent inbound traffic associated with the first flow from the second computing device (e.g., prior to the one or more subsequent inbound traffic being determined to be associated with the preferential flow) (e.g., the one or more subsequent inbound traffic associated with the first flow being determined to have a voice or a video component), i) classifying the one or more subsequent inbound traffic with the initial high QoS PHB markings and ii) transmitting to the third network device the one or more subsequent inbound traffic with the initial high QoS PHB markings.

In some embodiments, the method includes, in response to determining the first inbound traffic associated with the first flow having a preferential flow designation, causing additional inbound traffic associated with the first flow received from the second computing device after the authentication process to continue to be classified with the initial high QoS PHB markings; and, in response to not determining the first inbound traffic having a preferential flow designation, causing each additional inbound traffic associated with the first flow received from the second computing device after the authentication process to be classified with a second QoS PHB marking, wherein the second QoS PHB marking has a lower preferential value as compared to the initial high QoS PHB marking. In some embodiments, the second QoS PHB markings is based on a determined authentication value determined for the first flow.

In some embodiments, the method includes, in response to receiving one or more second inbound traffic associated with a second flow (e.g., the second flow being different from the first flow) from the second computing device (e.g., prior to the second inbound traffic being authenticated as a preferential flow), the one or more second inbound traffic being determined to have a second voice or a second video component, i) classifying (e.g., immediately classifying) each of the one or more second inbound traffic with the initial high QoS PHB marking and ii) transmitting to the third network device in the network the one or more second inbound traffic with the initial high QoS PHB markings; and initiating authentication of the one or more second inbound traffic as being a preferential flow (e.g., by sending a second authentication request to a software-defined network controller in the network), wherein, in response to receiving, during the authentication process, one or more second subsequent inbound traffic associated with the second flow from the second computing device (e.g., prior to the one or more second subsequent inbound traffic being associated with a preferential flow), the one or more second subsequent inbound traffic associated with the second flow being determined to have a second voice or a second video component, i) classifying the one or more second subsequent inbound traffic with the initial high QoS PHB markings and ii) transmitting to the third network device the one or more second subsequent inbound traffic with the initial high QoS PHB markings.

In some embodiments, the method includes, concurrent with the transmission of the one or more first inbound traffic with the initial high QoS PHB markings, initiating a timer associated with authentication for the first flow; and, in response to an expiration of the timer, causing each additional inbound traffic associated with the first flow received from the computing device to be classified with a second QoS PHB marking, wherein the second QoS PHB markings has a lower preferential value as compared to the initial high QoS PHB markings.

In some embodiments, the method includes, in response to receipt of a notification (e.g., from a SDN controller) of a successful authentication of the first flow being associated with a preferential flow, causing the timer to reset so as not to expire.

In another aspect, a method (e.g., to perform "trust but verify" operation for a device) is disclosed. The method includes, in response to receiving, at one of the network ports, from a computing device (e.g., a telephone or videoconference device), a discovery protocol message for the computing device and one or more first inbound traffic associated with a first flow (e.g., prior to the computing device being authenticated as a trusted device), the one or more first inbound traffic being determined to have a voice or a video component, i) classifying (e.g., immediately classifying) each of the one or more first inbound traffic with an initial high QoS (Quality of Service) PHB (Per-Hop Behavior) marking and ii) transmitting to a network device in the network the one or more first inbound traffic with the initial high QoS PHB markings; and initiating authentication of the computing device as a trusted device in the network (e.g., by sending an authentication request to a software-defined network controller in the network), wherein, in response to receiving, during the authentication process, one or more subsequent inbound traffic (e.g., associated with the first flow) from the computing device (e.g., prior to the computing device being determined to be a trusted device), i) classifying the one or more subsequent inbound traffic with the initial high QoS PHB markings and ii) transmitting to the network device the one or more subsequent inbound traffic with the initial high QoS PHB markings.

In some embodiments, the method includes, in response to determining the computing device being an authenticated trusted device, causing additional inbound traffic received from the computing device after the authentication process to continue to be classified with the initial high QoS PHB markings; and, in response to not determining the computing device to be an authenticated trusted device, causing each additional inbound traffic received from the computing device after the authentication process to be classified with a second QoS PHB marking, wherein the second QoS PHB marking has a lower preferential value as compared to the initial high QoS PHB marking. In some embodiments, the second QoS PHB markings is based on a determined authentication level for the computing device.

In some embodiments, the operation of initiating authentication of the computing device as a trusted device comprises registering parameters associated with the computing device from the discovery protocol message with a communication manager; and initiating a timer associated with authentication of the second computing device as a trusted device, wherein, in response to an expiration of the timer, causing each inbound traffic received from the computing device to be classified with a second QoS PHB marking, wherein the second QoS PHB markings has a lower preferential value as compared to the initial high QoS PHB markings.

In some embodiments, the operation of initiating authentication of the computing device as a trusted device comprises registering parameters associated with the computing device from the discovery protocol message with a communication manager; and in response to a successful authentication of the computing device, adding a static policy to trust voice/video flows from the computing device.

In some embodiments, receipt of the discovery protocol message from the computing device causes the apparatus to dynamically extend trust to the computing device prior to the computing device being authentication as a trusted device in the network.

In some embodiments, the dynamic extension of trust to the second computing device prior to the second computing device being authentication as a trusted device in the network comprises a trust-but-verify dynamic QoS design approach.

Example Network

FIG. 1 is an example network 100 that operates a trust-but-verify dynamic QoS operation, in accordance with an illustrative embodiment. As shown in FIG. 1, a plurality of network devices 102 (e.g., IP-based network devices shown as 102a-102g, and etc.) are coupled to network nodes 104 (e.g., a switch, router, wireless access point, and etc.) (shown as 104a-104g). Network devices 102 may have voice or video components and may include devices such as IP telephones, videoconferencing devices, projectors, and mobile/computing devices running one or more applications that transmit or receive data stream with a video or an audio component. Example of such applications includes voice call services, video chat services, instant messaging applications with voice call or video chat services, video conferencing applications, audio and video sharing and/or streaming services, gaming applications, collaboration tools, and etc.

The network 100 also includes a network core 106, which may include one or more servers, serving as a backbone of the network 100. Network core 102, in some embodiments, includes networking equipment to provide paths for the exchange of information between a distributed network devices (e.g., 104). Various types and quantities of equipment and structure may be included in the network core and each distributed network within the spirit and scope of this disclosure.

As shown in FIG. 1, the network 100 includes a Quality-of-Service controller 108 (shown as "QoS Controller" 108) that manages QoS policies for the network. In some embodiments, the QoS controller 108 is implemented as a module or application in a Software-Defined Networking (SDN) controller. SDN controller operates, in some embodiments, by separating and abstracting the control plane and data plane of networking systems. SDN allows network administrators to manage network services such as QoS policies.

Call-Level Dynamic QoS Operation

Figure 2:
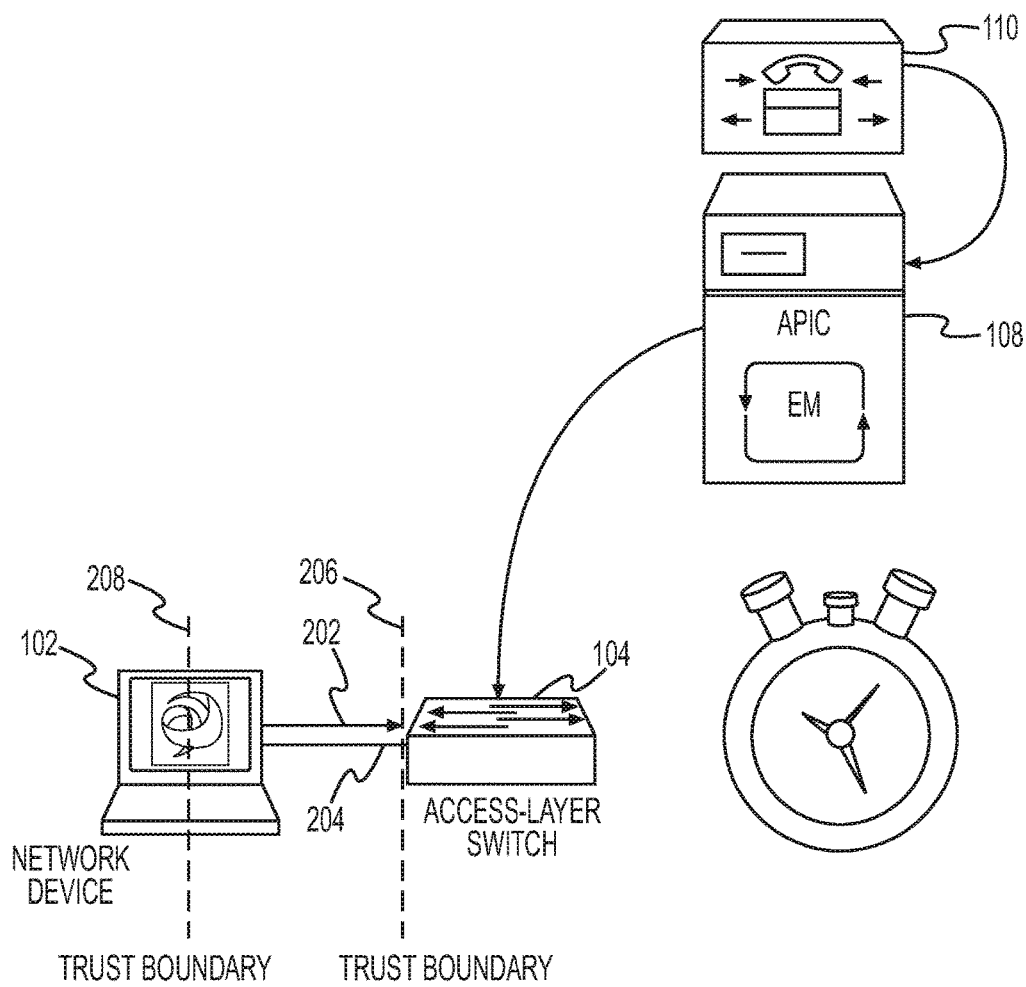
FIG. 2 is a diagram of an example call-level implementation of a trust-but-verify dynamic QoS operation, in accordance with an illustrative embodiment.
Figure 3:
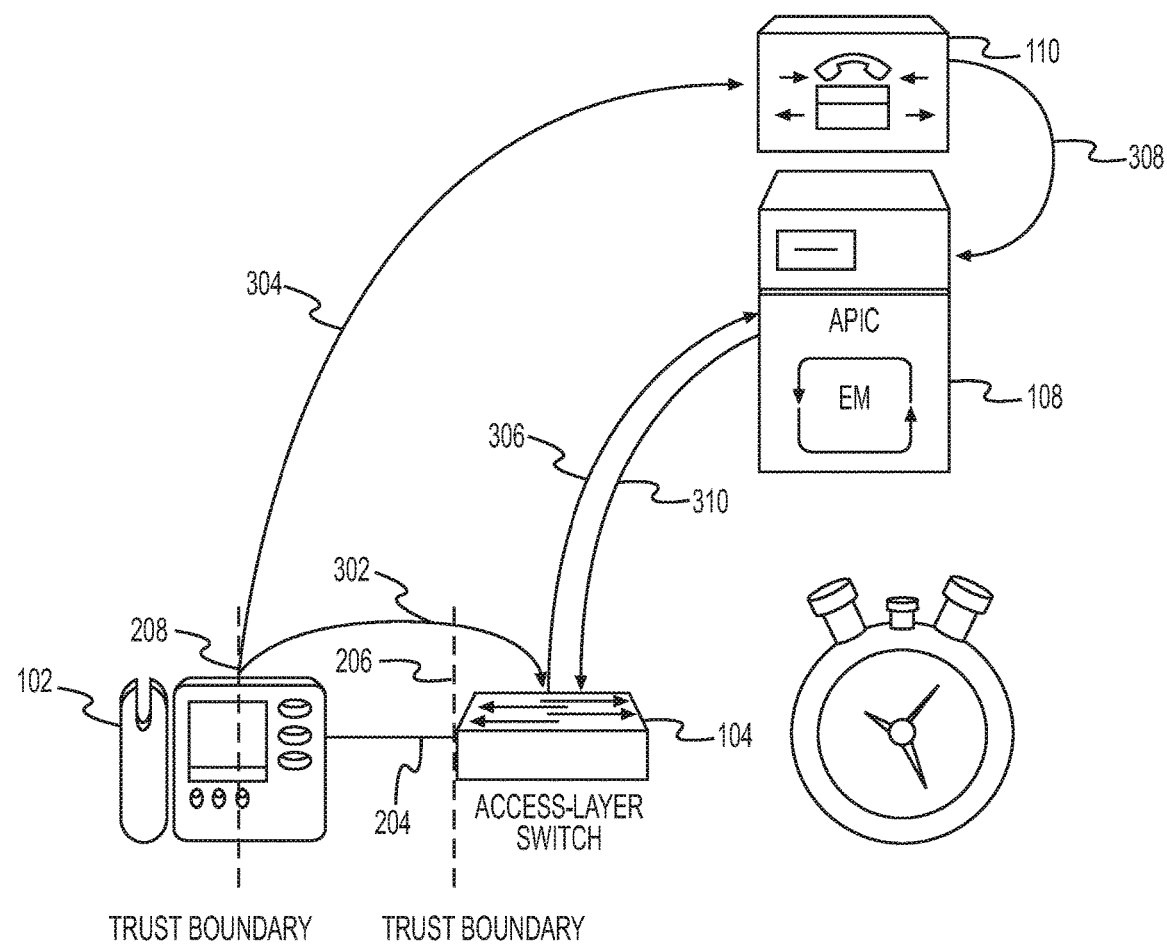
FIG. 3 is a diagram of an example device-level implementation of a trust-but-verify dynamic QoS operation, in accordance with an illustrative embodiment.

FIG. 2 is a diagram of an example call-level implementation of a trust-but-verify dynamic QoS operation, in accordance with an illustrative embodiment. FIG. 3 is a diagram of an example device-level implementation of a trust-but-verify dynamic QoS operation, in accordance with an illustrative embodiment.

Figure 4:
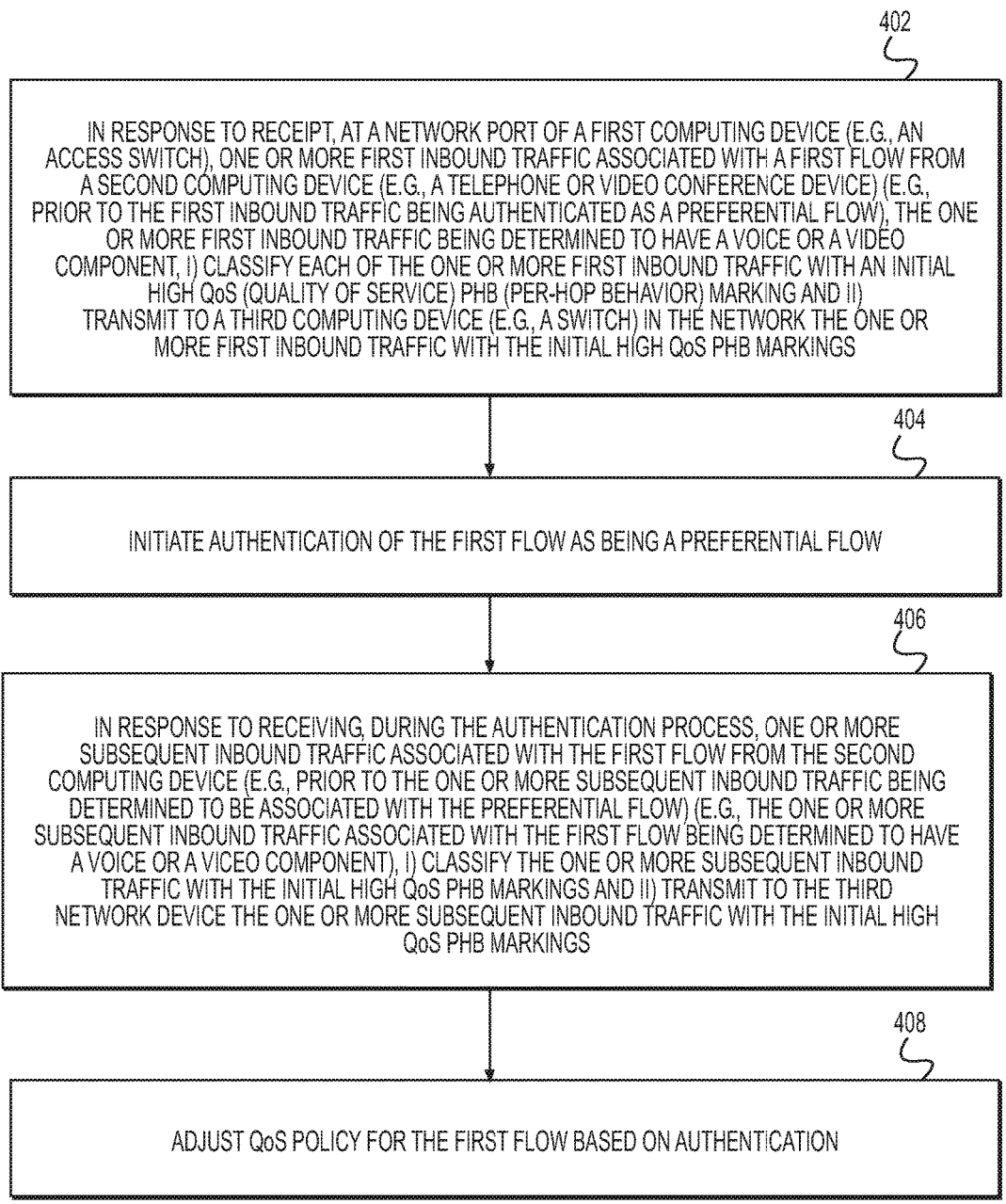
FIG. 4 is a diagram of an example operation of the call-level implementation of a trust-but-verify dynamic QoS operation, as discussed in relation to FIG. 2, in accordance with an illustrative embodiment.

FIG. 2 is now discussed in conjunction with FIG. 4. FIG. 4 is a diagram of an example operation of the call-level implementation of a trust-but-verify dynamic QoS operation, as discussed in relation to FIG. 2, in accordance with an illustrative embodiment.

As shown in FIG. 2, a network device 102 initiates traffic flow (202) having a voice or video component through a connected switch 104 (shown as an "Access-layer switch" 104) (e.g., via a wired or wireless connection 204).

As shown in FIG. 4, in response to receipt, at a network port of the connected switch 104 (i.e., first computing device), inbound traffic 202 associated with the initiated traffic flow 202 from the network device 102 (e.g., prior to the inbound traffic being authenticated as a preferential flow and, e.g., the inbound traffic being determined to have a voice or a video component), the access-layer switch 104 i) classifies (operation 402) each of the inbound traffic flow (e.g., 202) with an initial high QoS PHB (Per-Hop Behavior) marking and transmits the inbound traffic with the initial high QoS PHB markings to network devices (e.g., 104) in the network 100. That is, when switch 104 detects the traffic flow 202 includes a voice or video components, the switch 104 assumes (on a temporary basis) the new voice/video flow 202 to be associated with a high QoS policy (e.g., by designating a high trust level). To this end, the trust boundary (shown as trust boundary 206) of the access-layer switch 104 is extended to the network device 102 (shown as trust boundary 208) in which new voice/video flow is designated with a high QoS marking.

In some embodiments, switch 104 uses application inspection operations to determine that the inbound traffic include voice or video components. Example of application inspection operations includes IP ACLs (Access Control Lists) operations, Network Based Application Recognition (NBAR) operations, and/or Application Visibility and Control (AVC) operations.

Concurrent with, or shortly thereafter, the designation of the new voice/video flow as being associated with the high QoS policy, a timer is initiated at the access-layer switch for that particular application flow. In addition, the switch 104 initiates (operation 404) authentication of the call (i.e., associated with the first flow) to determine an authorized QoS policy for the call and the corresponding traffic flow.

In FIG. 4, the switch 104 initiates (operation 404) authentication of the first flow as being a preferential flow. During the authentication process, in response to receiving, one or more subsequent inbound traffic associated with the first flow from the network device 102, the switch 104 continues to classify (operation 406) the subsequent inbound traffic with the initial high QoS PHB markings and to transmit to the network device the subsequent inbound traffic with the initial high QoS PHB markings to other devices in the network 100. In some embodiments, the authentication request is sent (shown as 615a, 615b) to the call management system (110), which may be a call signaling system.

Referring still to FIG. 4, the switch 104 adjusts (operation 408) the QoS policy for the first flow based on the authentication.

In some embodiments, the access-layer switch 104 waits, for a pre-defined time period (e.g., during the authentication process), to receive a notification from the SDN controller 108 (shown as "APIC EM" 108) that a call setup message has been received by the SDN controller 108 from the call signaling system 110, for the particular device on that switch port. When an application known to have voice and video components and known to be controlled by a call management system (e.g., a unified call manager produced by Cisco Technology Inc.) has been identified, then traffic, in some embodiments, is classified and marked based upon the a pre-defined QoS policy applied to the device.

In some embodiments, this QoS policy may be previously defined based on application-level business intent through an SDN controller or other methods, such as manual CLI (command-line interface) configuration. Similarly, the identification of which applications are known to be controlled by call management systems can also be configured and pushed down via the SDN controller or may be configured manually. If the notification from the SDN controller for the particular application flow does not arrive before the timer expires, the switch shall modify the QoS policy applied to the device so as to change the marking of the application flows to some other QoS PHB.

Figure 6:
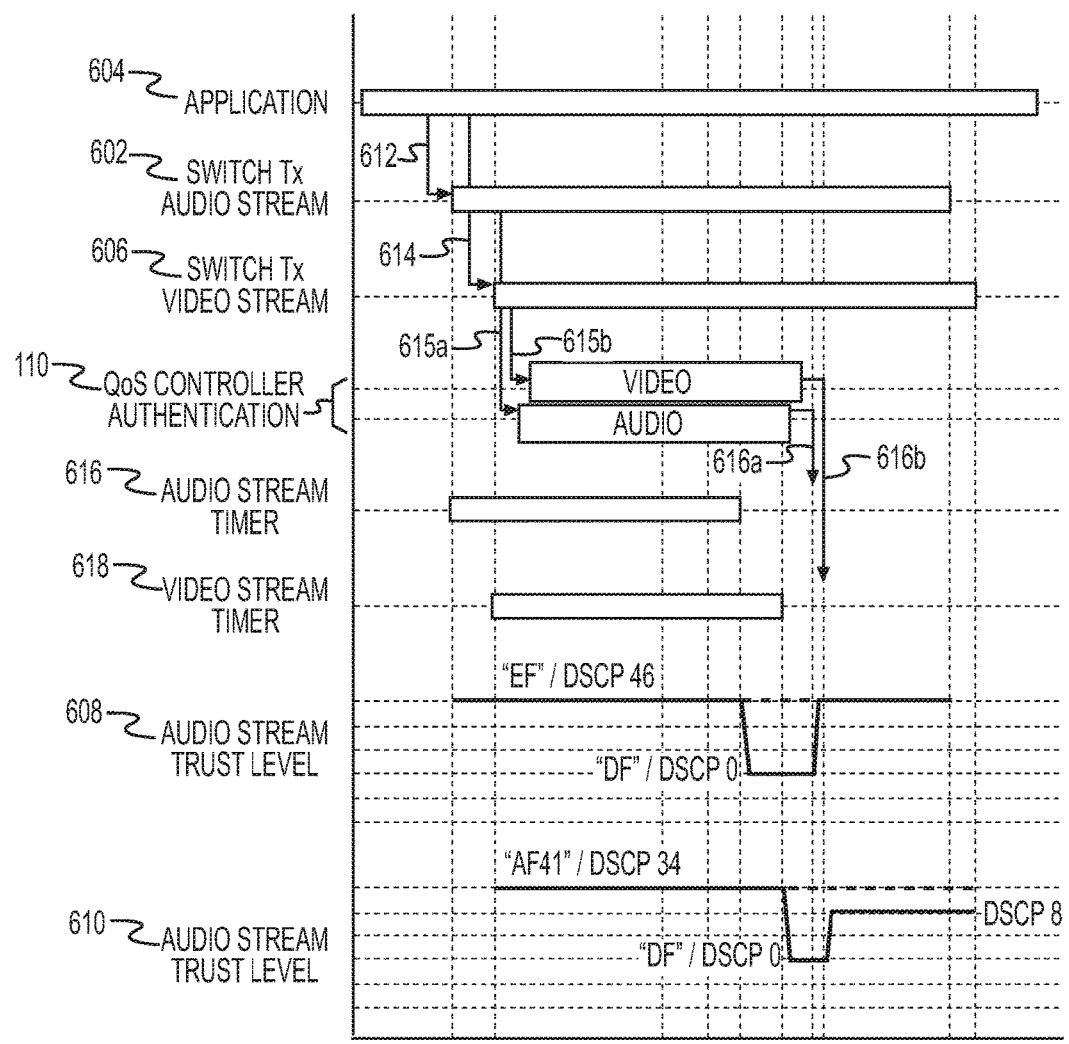
FIG. 6 is a diagram an example operation of the call-level implementation of a trust-but-verify dynamic QoS operation, as discussed in relation to FIGS. 2 and 4, in accordance with an illustrative embodiment.

FIG. 6 is a diagram an example operation of the call-level implementation of a trust-but-verify dynamic QoS operation, as discussed in relation to FIGS. 2 and 4, in accordance with an illustrative embodiment. In FIG. 6, audio traffic 602 (e.g., from an instant messaging application 604 such as Jabber, a videoconference application such as WebEx, a collaboration tool such as Spark, and etc.) may be marked (e.g., instantaneously marked) to a DSCP marking (shown as "Audio Stream Trust Level" 608) of Expedited Forwarding ("EF"/DSCP 46) upon initialization and transmission (612), and video traffic 606 (of the same application) may be marked (e.g., instantaneously marked) to a DSCP marking (shown as "Audio Stream Trust Level" 610) of Assured Forwarding ("AF41"/DSCP 34) upon initialization and transmission (614). In this example, if a notification (616a, 616b) from the QoS controller 108 for the particular application flow (e.g., 602, 606) does not arrive before the timer (e.g., 616, 618) expires, the switch 104 modifies the QoS policy (e.g., 608, 610) applied to the device so as to change the markings of the application flows (e.g., 602, 606) to some other QoS PHB. As shown, the high QoS designation (e.g., 608, 610) for each given flow (e.g., 606, 606) coincides with the flow respective timers (e.g., 616, 618). In this example, the default forwarding "DF" designation has a value of DSCP "0".

Referring still to FIG. 6, in instances where a notification (e.g., 616a, 616b) is received prior to, or after, the expiration of the timer, the QoS policy is adjusted to a level that is specified in the notification. In this example, the authenticated QoS policy for the audio flow is Expedited Forwarding ("EF"/DSCP 46), and the authenticated QoS policy for the video flow is Scavenger (DSCP 8). In some embodiments, the response of the switch to a given notification is configurable by the user (e.g., network administrator).

It is contemplated that this methodology could be extended to apply any QoS treatment for the application traffic, including deferential treatment (i.e. marking the flow as Scavenger/DSCP 8, per RFC 3662). The modified QoS policy may be previously defined based on application-level business intent through an SDN controller, or other methods; and subsequently pushed down to the switch.

Applications known to have individual voice and video components, but are opaque to the application inspection technology (for instance being a single encrypted flow) may receive QoS treatment based on the overall encrypted flow, rather than the individual components. This operation could be extended to any type of application with any "call" management system, indicating the establishment of a new information flow across the network infrastructure.

In some embodiments, the timer is end-user configurable (e.g., to allow some flexibility to the network operator based on the particular network implementation). In other embodiments, the timer is set by the overall system. In some embodiments, the expiration is set between about 1000 ms (milliseconds) and 5000 ms. In other embodiments, the expiration is set greater than 5000 ms.

In some embodiments, the notification is synchronously received as part of a new session established between the switch (e.g., 104) and the SDN controller (e.g., 108). In other embodiments, the notification is synchronously received as part of a long-term already-established session between the switch (e.g., 104) and the SDN controller (e.g., 108). In yet other embodiments, the notification is asynchronously received via the switch (e.g., 104) subscribing to receive such notifications from the SDN controller (e.g., 108).

The inbound traffic may be determined to have a voice or a video component using classification technologies. In some embodiments, the Access-layer switches (defined as switches which have endpoint devices directly attached to switch ports) implements classification technologies such as IP access-lists (e.g., to identify flows), Network Based Application Control-NBAR engine (e.g., to inspect inbound traffic coming from devices connected to switch ports).

The actual form of the QoS policies implemented by the switch may vary based upon the capabilities of the particular switch. Implementation of QoS policies may be through applying different sections of CLI configuration previously pushed to the switch via the SDN controller potentially via macro commands which are automatically executed by the switch based on whether a notification was received or not from the SDN controller for the particular application flow. Other methods include direct modification of flow tables (data plane manipulation) directly by the switch itself, based upon whether a notification was received or not from the SDN controller for the particular application flow.

Upon termination of a call, the call signaling system will send a message to the SDN controller, indicating the call has ended. The SDN controller will notify the switch of the call termination. The switch should verify via the application classification technology that the flows for the particular application have ended. The notification from the SDN controller can then be used to remove the flow entry from the application inspection technology database of flows. This could be done immediately or after a short duration to account for any potential remaining packets traversing the network. Should the actual application data flow continue after it has been removed from the application inspection technology database, it will be viewed as a new flow, and subject to the procedure defined above for new flows.

Alternatively, the media flows corresponding to the particular application could simply be allowed to time out from the application inspection technology (if there is no concern that the flows may continue after the call signaling system has indicated that the call has ended). This same methodology can also be applied to end-devices connected to wireless access points connected through Wireless LAN Controllers (WLCs). The behavior is identical, with the WLC implementing the application inspection technology (in this case Cisco Application Visibility and Control (AVC)).

Device-Level Dynamic QoS Operation

Figure 5:
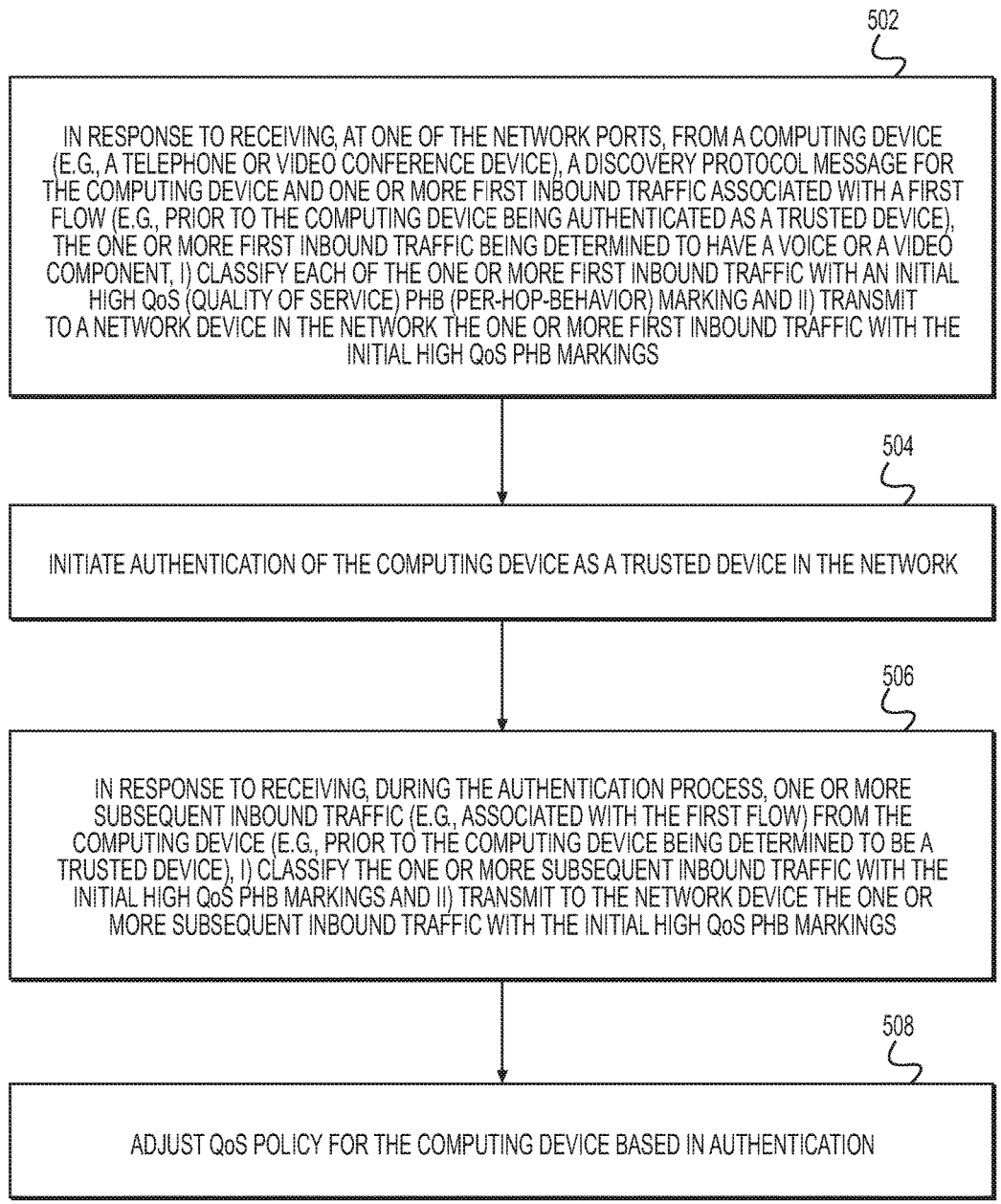
FIG. 5 is a diagram of an example operation of the device-level implementation of a trust-but-verify dynamic QoS operation, as discussed in relation to FIG. 3, in accordance with an illustrative embodiment.

FIG. 3 is a diagram of an example device-level implementation of a trust-but-verify dynamic QoS operation, in accordance with an illustrative embodiment. FIG. 3 is now discussed in conjunction with FIG. 5. FIG. 5 is a diagram of an example operation of the device-level implementation of a trust-but-verify dynamic QoS operation, as discussed in relation to FIG. 3, in accordance with an illustrative embodiment.

As shown in FIG. 3, a network device 102 announces (302) itself to a network 100 (e.g., via a discovery protocol message to an access layer switch 104). In response, the access-layer switch 104 dynamically extends trust to network device 102 (e.g., without authentication). In FIG. 3, the trust boundary (shown as trust boundary 206) of the access-layer switch 104 is extended (shown as trust boundary 208) to the network device 102. To this end, traffic from the network device 102 are marked with a high QoS marking by the switch 104 as the traffic is forwarded through the network 100.

As further shown in FIG. 5, the switch 104 initiate (operation 504) authentication of the computing device as a trusted device in the network. In FIG. 3, the device 102 registers with the call management system 110. An example of the call management system 110 (also referred to as a communication call control platform) is the Cisco Unified Communication Manager. In addition, the access-layer switch 104 notifies (306) the QoS controller (108) (shown as "APIC EM" 108) of a new discovered device (e.g., Cisco discovery-protocol device 102). Examples of discovery protocol includes the Cisco Discovery Protocol (CDP), the link layer discovery protocol (LLDP), and etc.

The call management system 110 verifies the registration of device 102 and calls on, via API, the QoS controller 108 to install a policy to statically trust voice/video flows from the device 102. During the verification process, in response to receiving subsequent inbound traffic (e.g., associated with the first flow) from the computing device 102, the access-layer switch 104 continues to classify (operation 506) the subsequent inbound traffic with the initial high QoS PHB markings and to forward the subsequent inbound traffic with the initial high QoS PHB markings to devices in the network 100.

Because the device 102 has a designation of a trusted device, outbound traffic to the device 102 may be marked with a high QoS marking as well.

As shown in FIG. 5, the switch 104 may adjust (operation 508) the QoS policy for the computing device 102 based on the authentication. In FIG. 3, if the management system 110 cannot verify device registration (or determine the device to not be a trusted device), for example, and cannot provide confirmation within a fixed time interval, then trust is revoked from the device.

Results

Figure 7:
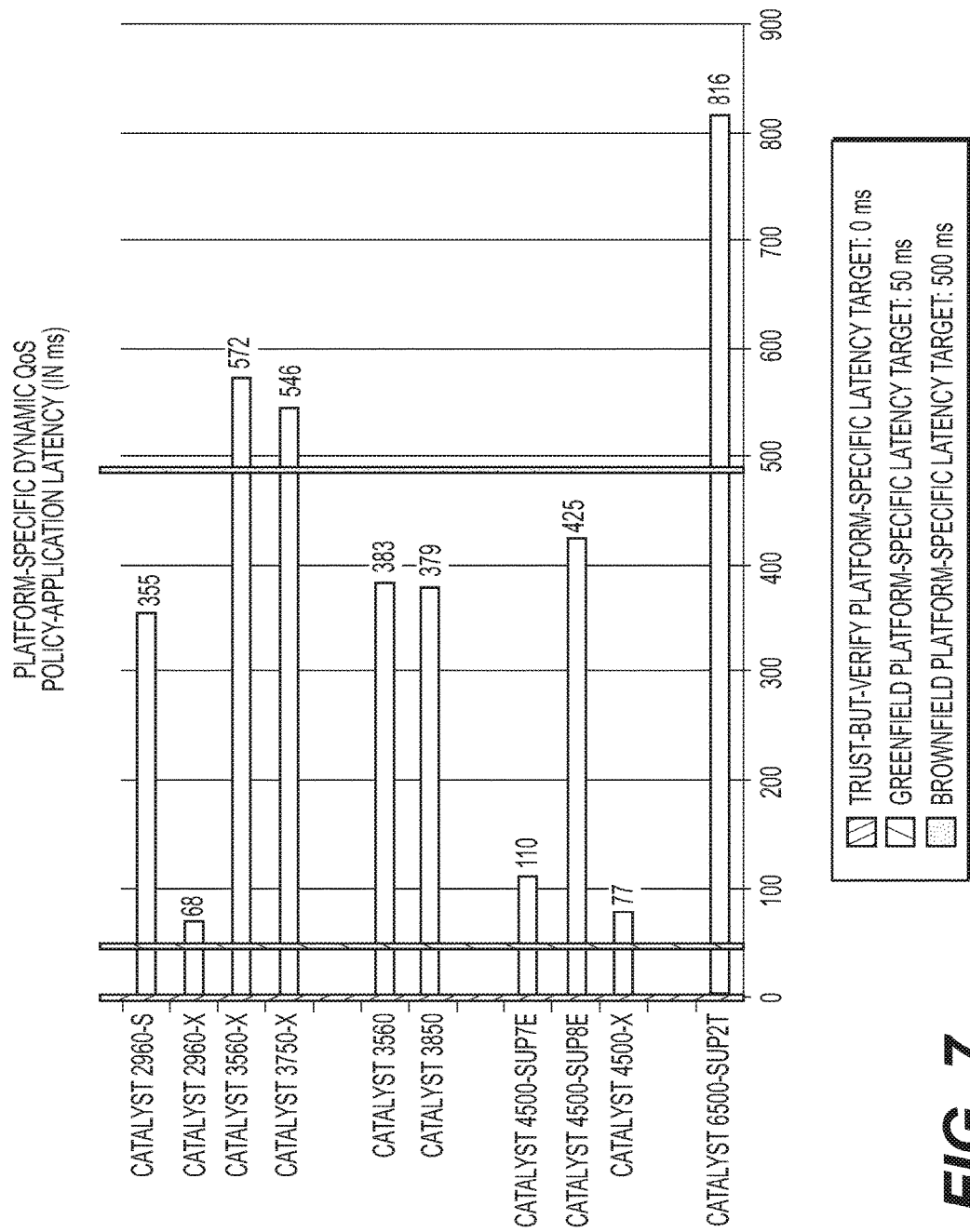
FIG. 7 is a diagram showing example performance improvements of the exemplified system and method on a platform-by-platform basis over other systems.

FIG. 7 is a diagram showing example performance improvements of the exemplified system and method on a platform-by-platform basis over other systems.

Discussion

Voice and video software applications which reside on endpoint devices such as PCs, laptops, tablets, and smartphones, and etc., require correct Quality of Service (QoS) markings in order to receive the necessary Per-Hop Behavior (PHB) through network infrastructure equipment in order to guarantee a high Quality of Experience (QoE) for the end user.

QoS controllers, in some embodiments, dynamically apply QoS policies to appropriate network devices, via an API, which allows for specific voice and/or video flows to be classified and marked so as to receive the necessary QoS PHB throughout the network infrastructure. In some embodiments, the QoS controller is a Software-Defined Networking (SDN) controller that receives, via API calls, signaling from a call management system (e.g., for telephone and videoconference devices) for voice and/or video calls when voice or video calls are being established or terminated. However, applying dynamic QoS policy after the call has been established has shortcomings in certain instances. For example, many codecs, (i.e., coder-decoder) used to decode an encoded data stream from transmission, adjust decoding operations based on detected characteristics of a network and/or data stream often within a first few hundred milliseconds after the data stream (e.g., for voice and media) has begun to flow across the network. Application of dynamic QoS policies, at the first few hundred milliseconds of flow, is time constrained (e.g., in the SDN controller processing the API request; creating and sending dynamic policy to endpoint devices to which the codecs resides, which then have to program and implement the dynamic policy). When the endpoint devices are physically separated from the network controller, e.g., by a wide area network (WAN), the application of QoS policies is often found to take longer, e.g., it may take several seconds into a voice or video call before the users receive appropriate QoS treatment.

Furthermore, certain rate adaptive codecs may take several minutes to ramp back up to the initial quality settings if drops occur in the first few hundred milliseconds of the call.

An example QoS controller maybe implemented in, or as, an Application Policy Infrastructure Controller Enterprise Module (produced by Cisco Technology Inc.). The QoS controller, in some embodiments, includes a Dynamic QoS component which applies QoS policy to network devices which are directly attached to endpoints which are participating in a voice and/or video call. The QoS controller, in some embodiments, uses a design model in which voice and/or video traffic from applications within endpoint devices is classified and marked with a default QoS PHB treatment until the SDN controller modifies the policy to allow it to be classified and marked with the correct QoS PHB treatment. This occurs after the call has already been established and may take anywhere from several hundred milliseconds to several seconds to set up (depending on the network topology and network conditions).

Conventional QoS implementations often sets a flow with a low default QoS policy until the SDN controller notifies the infrastructure switches and/or wireless LAN controllers (WLCs) that the call should receive preferential QoS PHB treatment. The delay in applying the preferential QoS PHB treatment can result in codecs down speeding and an overall lower Quality of Experience (QoE) for the end-user, which may last anywhere from several hundred milliseconds to even several minutes. By applying a trust-but-verify model, the preferential QoS PHB treatment can be applied immediately and without delay at the beginning of the call, preserving the QoE for the end-user.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations may also be implemented in combination in a single implementation.

For example, in some embodiments, the exemplified system and method can be used to provide a deferential QoS PHB (i.e. RFC 3662 Lower Per-Domain Behavior treatment) for an application flow, until notification is received from the SDN controller. At that point, the QoS policy can be modified to provide preferential QoS PHB treatment. This may be useful for non-voice/video flows which are under the control of a call management system.

Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Particular implementations of the subject matter described in this specification have been described. Other implementations are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous. Further, any methods described in this application may be implemented as computer software on a computer readable medium.

What is claimed is:

1. An apparatus comprising:
   network ports;
   a processor coupled to the network ports and a memory; and
   the memory having instructions stored thereon, wherein execution of the instructions, cause the processor to:
      in response to receiving, at one of the network ports, one or more first inbound traffic associated with a first flow from a computing device, the one or more first inbound traffic being determined to have a voice or a video component, i) classify each of the one or more first inbound traffic with an initial high QoS (Quality of Service) PHB (Per-Hop Behavior) marking and ii) transmit to a network device in the network the one or more first inbound traffic with the initial high QoS PHB markings; and
      initiate authentication of the first flow as being a preferential flow,
      wherein, in response to receiving, during the authentication process, one or more subsequent inbound traffic associated with the first flow from the computing device, i) classify the one or more subsequent inbound traffic with the initial high QoS PHB markings and ii) transmit to the network device the one or more subsequent inbound traffic with the initial high QoS PHB markings.

2. The apparatus of claim 1, wherein the instructions, when executed by the processor, cause the processor to:
   in response to determining the first inbound traffic associated with the first flow having a preferential flow designation, cause additional inbound traffic associated with the first flow received from the computing device after the authentication process to continue to be classified with the initial high QoS PHB markings; and
   in response to not determining the first inbound traffic having a preferential flow designation, cause each additional inbound traffic associated with the first flow received from the computing device after the authentication process to be classified with a second QoS PHB marking, wherein the second QoS PHB marking has a lower preferential value as compared to the initial high QoS PHB marking.

3. The apparatus of claim 2, wherein the second QoS PHB markings is based on a determined authentication value determined for the first flow.

4. The apparatus of claim 1, wherein the instructions, when executed by the processor, cause the processor to:
   in response to receiving one or more second inbound traffic associated with a second flow from the computing device, the one or more second inbound traffic being determined to have a second voice or a second video component, i) classify each of the one or more second inbound traffic with the initial high QoS PHB marking and ii) transmit to a given network device in the network the one or more second inbound traffic with the initial high QoS PHB markings; and
   initiate authentication of the one or more second inbound traffic as being a preferential flow,
   wherein, in response to receiving, during the authentication process, one or more second subsequent inbound traffic associated with the second flow from the computing device, the one or more second subsequent inbound traffic associated with the second flow being determined to have a second voice or a second video component, i) classify the one or more second subsequent inbound traffic with the initial high QoS PHB markings and ii) transmit to the given network device the one or more second subsequent inbound traffic with the initial high QoS PHB markings.

5. The apparatus of claim 1, wherein the instructions, when executed by the processor, cause the processor to:
concurrent with the transmission of the one or more first inbound traffic with the initial high QoS PHB markings, initiate a timer associated with authentication of the first flow; and
in response to an expiration of the timer, cause each additional inbound traffic associated with the first flow received from the computing device to be classified with a second QoS PHB marking, wherein the second QoS PHB markings has a lower preferential value as compared to the initial high QoS PHB markings.

6. The apparatus of claim 5, wherein the instructions, when executed by the processor, cause the processor to:
in response to receipt of a notification of a successful authentication of the first flow being associated with a preferential flow, cause the timer associated with the first flow to reset so as not to expire.

7. The apparatus of claim 1, wherein i) the classification and transmission of each of the one or more subsequent inbound traffic with the initial high QoS PHB marking and ii) the concurrent validation of the computing device or the one or more subsequent inbound traffic being associated with a trusted device, collectively, comprises a trust-but-verify dynamic QoS design approach.

8. A method to provide QoS operations, the method comprising:
in response to receipt, at a network port of a first computing device, one or more first inbound traffic associated with a first flow from a second computing device, the one or more first inbound traffic being determined to have a voice or a video component, i) classifying each of the one or more first inbound traffic with an initial high QoS (Quality of Service) PHB (Per-Hop Behavior) marking and ii) transmitting to a third computing device in the network the one or more first inbound traffic with the initial high QoS PHB markings; and
initiating authentication of the first flow as being a preferential flow,
wherein, in response to receiving, during the authentication process, one or more subsequent inbound traffic associated with the first flow from the second computing device, i) classifying the one or more subsequent inbound traffic with the initial high QoS PHB markings and ii) transmitting to the third network device the one or more subsequent inbound traffic with the initial high QoS PHB markings.

9. The method of claim 8, comprising:
in response to determining the first inbound traffic associated with the first flow having a preferential flow designation, causing additional inbound traffic associated with the first flow received from the second computing device after the authentication process to continue to be classified with the initial high QoS PHB markings; and
in response to not determining the first inbound traffic having a preferential flow designation, causing each additional inbound traffic associated with the first flow received from the second computing device after the authentication process to be classified with a second QoS PHB marking, wherein the second QoS PHB marking has a lower preferential value as compared to the initial high QoS PHB marking.

10. The method of claim 9, wherein the second QoS PHB markings is based on a determined authentication value determined for the first flow.

11. The method of claim 8, comprising:
in response to receiving one or more second inbound traffic associated with a second flow from the second computing device, the one or more second inbound traffic being determined to have a second voice or a second video component, i) classifying each of the one or more second inbound traffic with the initial high QoS PHB marking and ii) transmitting to the third network device in the network the one or more second inbound traffic with the initial high QoS PHB markings; and
initiating authentication of the one or more second inbound traffic as being a preferential flow,
wherein, in response to receiving, during the authentication process, one or more second subsequent inbound traffic associated with the second flow from the second computing device, the one or more second subsequent inbound traffic associated with the second flow being determined to have a second voice or a second video component, i) classifying the one or more second subsequent inbound traffic with the initial high QoS PHB markings and ii) transmitting to the third network device the one or more second subsequent inbound traffic with the initial high QoS PHB markings.

12. The method of claim 8, comprising:
concurrent with the transmission of the one or more first inbound traffic with the initial high QoS PHB markings, initiating a timer associated with authentication for the first flow; and
in response to an expiration of the timer, causing each additional inbound traffic associated with the first flow received from the computing device to be classified with a second QoS PHB marking, wherein the second QoS PHB markings has a lower preferential value as compared to the initial high QoS PHB markings.

13. The method of claim 12, comprising:
in response to receipt of a notification of a successful authentication of the first flow being associated with a preferential flow, causing the timer to reset so as not to expire.

* * * * *